US008977660B1

(12) United States Patent
Xin et al.

(10) Patent No.: US 8,977,660 B1
(45) Date of Patent: Mar. 10, 2015

(54) MULTI-LEVEL DISTRIBUTED HASH TABLE FOR DATA STORAGE IN A HIERARCHICALLY ARRANGED NETWORK

(75) Inventors: Qin Xin, Broken Arrow, OK (US); Feng Zhang, Sherborn, MA (US); Qi Bao, Boxborough, MA (US)

(73) Assignee: EMC Corporation, Hopkinton, MA (US)

( * ) Notice: Subject to any disclaimer, the term of this patent is extended or adjusted under 35 U.S.C. 154(b) by 121 days.

(21) Appl. No.: 13/402,329

(22) Filed: Feb. 22, 2012

Related U.S. Application Data (60) Provisional application No. 61/582,122, filed on Dec. 30, 2011.

(51) Int. Cl.
*G06F 12/00* (2006.01)
*G06F 17/30* (2006.01)
*H04N 21/231* (2011.01)

(52) U.S. Cl.
CPC .............................. *H04N 21/23103* (2013.01)
USPC .......................................... 707/827; 707/747

(58) Field of Classification Search
CPC .......... G06F 17/3033; G06F 17/30339; H04N 21/23103; H04L 29/08144
See application file for complete search history.

(56) References Cited

U.S. PATENT DOCUMENTS

| | | | | |
|---|---|---|---|---|
| 7,827,182 B1* | 11/2010 | Panigrahy | | 707/747 |
| 7,925,781 B1* | 4/2011 | Chan et al. | | 709/238 |
| 8,208,477 B1* | 6/2012 | Xiong et al. | | 370/400 |
| 2003/0202536 A1* | 10/2003 | Foster et al. | | 370/469 |
| 2008/0307107 A1* | 12/2008 | Chen et al. | | 709/231 |
| 2009/0234917 A1* | 9/2009 | Despotovic et al. | | 709/204 |
| 2009/0260014 A1* | 10/2009 | Cameron | | 718/104 |
| 2009/0282256 A1* | 11/2009 | Rakic et al. | | 713/176 |
| 2011/0099372 A1* | 4/2011 | Annapureddy et al. | | 713/168 |
| 2012/0124079 A1* | 5/2012 | Kinsella | | 707/769 |
| 2013/0031229 A1* | 1/2013 | Shiga et al. | | 709/223 |

OTHER PUBLICATIONS

Do et al. "P2VoD: providing fault tolerant video-on-demand streaming in peer-to-peer environment." Jun. 2004. IEEE. 2004 IEEE Conference on Communications, vol. 3, pp. 1467-1472.*

Iqbal, Razib et al.; A Distributed Camera Network Architecture Supporting Video Adaptation; School of Information Technology and Engineering, University of Ottawa.*

Dabek, Frank et al.; Designing a DHT for low latency and high throughput; MIT Computer Science and Artificial Intelligence Laboratory; pp. 12-13.*

(Continued)

*Primary Examiner* — Neveen Abel Jalil
*Assistant Examiner* — Michael K Tamaru
(74) *Attorney, Agent, or Firm* — BainwoodHuang (57) ABSTRACT

An improved technique for distributed data storage employs multiple DHT (distributed hash table) rings provided at different levels of a network hierarchy. A computing node is identified for data storage by performing multiple hashing operations, one for each DHT ring. The hashing operations for the different rings are distinct in that they are performed using different hashing functions and/or are performed on different data sources. In one example, a 2-level DHT is formed from a group of LANs forming a first DHT ring and a group of computing nodes, within each LAN, forming a second DHT ring.

25 Claims, 7 Drawing Sheets

(56) References Cited

OTHER PUBLICATIONS

Aguilera et al., "Using Erasure Codes Efficiently for Storage in a Distributed Aystem", Proc. of the 2005 Int. Conf. on Dependable Systems and Networks (DSN'05), IEEE Computer Society, 2005.
Castro et al., "Topology—Aware Routing in Structured Peer-to-Peer Overlay Networks", A. Schiper et al. (Eds.), Future Directions in DC 2002, pp. 103-107, 2003.
Chang et al , "Bigtable: A Distributed Storage System for Structured Data", ACM. Trans. Comput. Syst. 26, 2, Article 4, Jun. 2008.
DeCandia et al., "Dynamo: Amazon's Highly Available Key-Value Store", SOSP'07, Oct. 14-17, 2007, Stevenson, Washington.
Dabek et al , "Designing a DHT for Low Latency and High Throughput", NSDI'04 Technical Paper, retrieved from http://static.usenix.org/events/nsdi04/tech/full_papers/dabek/dabek_html/ on Jul. 19, 2012.
Dabek et al., "Vivaldi: A Decentralized Network Coordinate System", SIGCOMM'04, Aug. 30-Sep. 3, 2004, Portland, Oregon.
Goodson et al., "Efficient Byzantine-Tolerant Erasure-Coded Storage", Proc. of the 2004 Int. Conference on Dependable Systems and Networks (DSN'04), IEEE Computer Society, 2004.
Greenan et al., "Reliability of XOR Based Erasure Codes on Heterogeneous Devices", International Conference on Dependable Systems and Networks, Anchorage, AK, pp. 147-156, Jun. 24-27, 2008.
Greenan, "Reliability and Power-Efficiency in Erasure-Coded Storage Systems", Technical Report UCSC-SSRC-09-08, University of California, Santa Cruz, Dec. 2009.
Hafner et al., "Notes on Reliability Models for Non-MDS Erasure Codes", IBM report, 2006.
Lakshman et al., "Cassandra—A Decentralized Structured Storage System", ACM SIGOPS Operating Systems Review, vol. 44, Issue 2, pp. 35-40, Apr. 2010.
Prasad et al. "Bandwidth Estimation: Metrics, Measurement Techniques, and Tools", IEEE Network, vol. 17, Issue 6, pp. 27-35, Nov./Dec. 2003.
Ratnasamy et al., "A Scalable Content-Addressable Network", SIGCOMM01, Aug. 27-31, 2001, San Diego, CA.
Ratnasamy et al., "Topologically-Aware Overlay Construction and Server Selection", INFOCOM2002, 21st Annual Joint Conf. of the IEEE Comp. and Com. Societies, pp. 1190-1199, 2002.
Rowstron et al., "Pastry: Scalable, Distributed Object Location and Routing for Large-Scale Peer-to-Peer Systems", R. Guerraoui (Ed.), Middleware 2001, pp. 329-350, 2001.
Stoica et al., "Chord: A Scalable Peer-to-Peer Lookup Service for Internet Applications", SIGCOMM'01, Aug. 27-31, 2001, San Diego, CA.
Weatherspoon, Hakim, "Design and Evaluation of Distributed Wide-Area On-line Archival Storage Systems", Appears in University of California, Berkeley PhD Dissertation, Technical Report No. UCB/EECS-2006-130, Oct. 13, 2006.
Well et al., "CRUSH: Controlled, Scalable, Decentralized Placement of Replicated Data", SC2006. Nov. 2006, Tampa, FL.

\* cited by examiner

MULTI-LEVEL DISTRIBUTED HASH TABLE FOR DATA STORAGE IN A HIERARCHICALLY ARRANGED NETWORK

CROSS REFERENCE TO RELATED APPLICATIONS

This application claims the benefit under 35 U.S.C. §119(e) of U.S. Provisional Application Ser. No. 61/582,122 entitled "TECHNIQUES FOR TWO-LEVEL DISTRIBUTED HASH TABLE (DHT) DATA PLACEMENT," filed on Dec. 30, 2011, the contents and teachings of which are hereby incorporated by reference in their entirety.

BACKGROUND

Data storage applications have conventionally employed distributed hash tables (DHTs) for storing data. As is known, a DHT includes a ring of computing nodes in which each node has a pointer to a successor node and in which nodes are identified for data storage using a hash key. In a conventional scenario, a "keyspace" (i.e., range of possible values) of a hash key is divided among the nodes of a DHT ring, with each successor node (except the first) covering the next highest range of keyspace values. To store data in a DHT ring, a hash function is applied to the data or to some identifier associated with the data to produce a hash key. The hash key is then applied to the DHT ring and passed from one node to the next until a matching slot is identified. The matching "slot" is the node having the keyspace range that encompasses the hash key. The data are then stored in the matching node. Metadata are generally created to maintain the location of the stored data within the DHT ring. To retrieve stored data from a DHT ring, the metadata are accessed, the node on which the data are stored is identified, and the data are read from the identified node.

Prior examples of DHTs used for data placement include the Chord system developed at MIT and the Dynamo storage system developed by Amazon.com.

SUMMARY

Prior implementations of DHTs typically access computing nodes in a flat structure, simply by their node IDs. Unfortunately, these flat structures may be inefficient, especially as the number of nodes in a DHT ring becomes large.

As is known, conventional computer networks have a hierarchical structure including different levels such as net, subnet, LAN (local area network), WAN (wide area network), and so forth. In addition, overlay networks can be constructed with their own defined hierarchies. It has been recognized that the hierarchical structure of computer networks can be used advantageously to improve the efficiency of DHT rings.

In contrast with prior DHT approaches, an improved technique for distributed data storage employs multiple DHT rings provided at different levels of a network hierarchy. A computing node is identified for data storage by performing multiple hashing operations, one for each DHT ring. The hashing operations for the different rings are distinct in that they are performed using different hashing functions and/or are performed on different data sources.

In some examples, the improved technique includes a first ring of nodes, where each node of the first ring of nodes is designated as a "head node" that represents a different local area network (LAN). The first ring of nodes can therefore be regarded as a ring of LANs. The improved technique also includes a second ring of nodes, in which each node is a different computing node within a selected LAN of the first ring of nodes. To store data, first and second independent hashing operations are performed. The first hashing operation generates a first hash key for identifying a matching LAN, and the second hashing operation generates a second hash key for identifying a matching computing node within the matching LAN. Data can then be stored on the matching computing node.

In accordance with certain embodiments, a method of storing data in a computing network includes performing a first hashing operation to generate a first key and performing a second hashing operation to generate a second key. The method further includes applying the first key to a first logical ring of computing nodes of the computing network to identify a matching node that satisfies at least one criterion associated with the first key, and applying the second key to a second logical ring of computing nodes of the computing network to identify a matching node of the second logical ring of computing nodes that satisfies at least one criterion associated with the second key. The second logical ring of computing nodes includes the matching node of the first logical ring of computing nodes and a set of nodes that are distinct from the first logical ring of computing nodes. The method still further includes directing at least a portion of the data to be stored on the matching node of the second logical ring of computing nodes. The computing network is arranged hierarchically with the first logical ring of computing nodes representing a first network level and the second logical ring of computing nodes representing a second network level that is lower than the first network level.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWING

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION

An improved technique for distributed data storage employs multiple DHT rings provided at different levels of a network hierarchy. A computing node is identified for data storage by performing multiple hashing operations, one for each DHT ring. Arranging computing nodes in different DHT rings according to the network hierarchy greatly improves the efficiency of data storage and provides other advantages, which will become apparent from the ensuing description.

Figure 1:
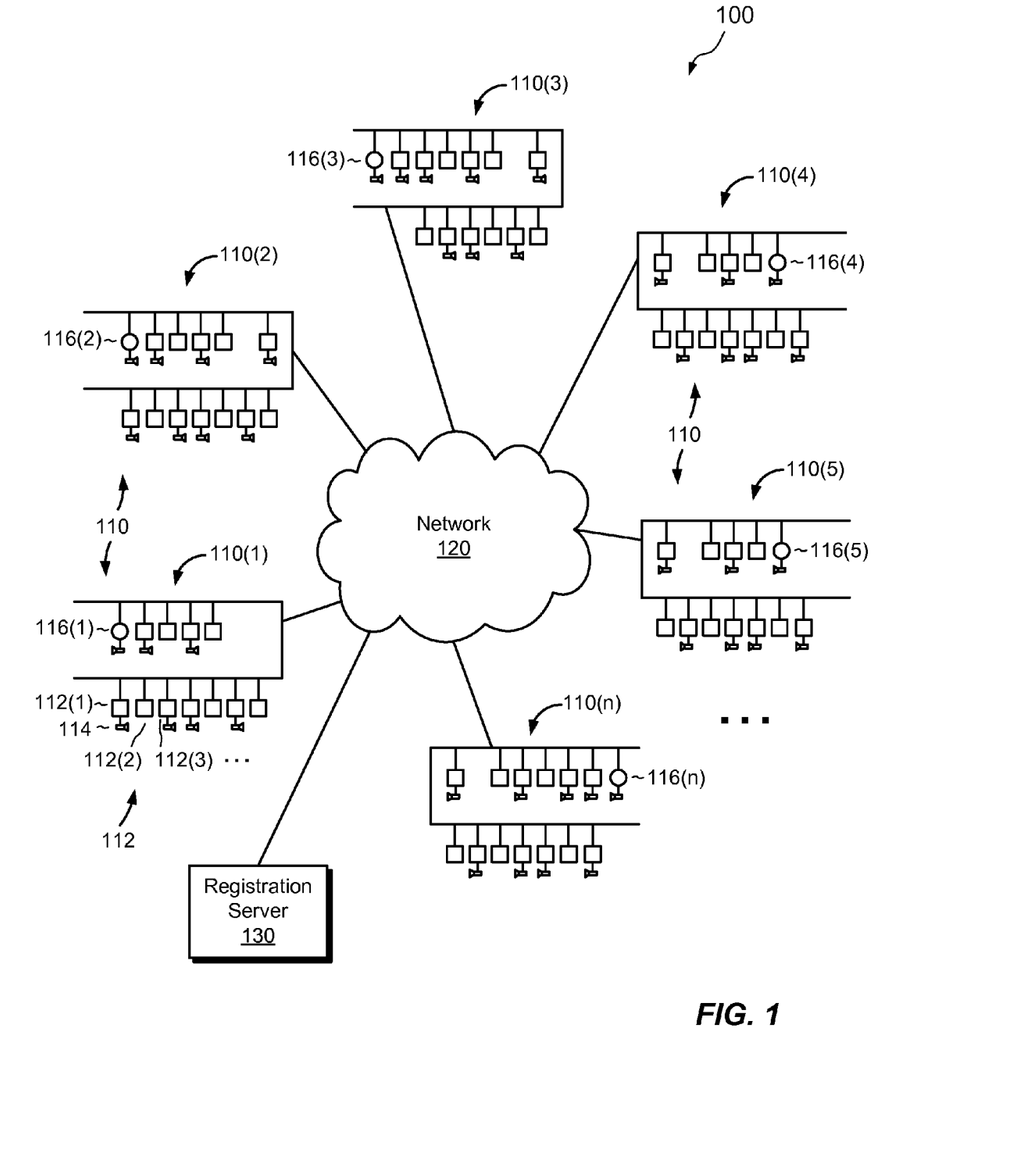
FIG. 1 is a simplified schematic of an example environment that includes LANs and nodes within LANs, in which multiple DHT rings are provided for improved data storage.

FIG. 1 shows an example environment 100 for implementing data storage with multiple DHT rings. The environment 100 includes multiple LANs (local area networks) 110 (e.g., LANs 110(1)-110(n)) connected to a network 120. Each LAN 110 includes multiple computing nodes 112. For example, LAN 110(1) includes computing nodes 112(1), 112(2), 112(3), and so forth. There may be any number of LANs 110 and any number of computing nodes 112 provided on each LAN.

Some of the computing nodes 112 may have video cameras 114. In some examples, the video cameras 114 collect video data, which is transferred to the respective nodes 112 to which the video cameras 114 are connected. The nodes 112 may then direct storage of the video data in a distributed manner on other nodes 112 of the environment 100.

For each LAN 110, one computing node 112 is designated as a head node for representing the LAN 110 to other LANs and other nodes of the network 120. For example, node 116(1) is the head node for LAN 110(1), node 116(2) is the head node for LAN 110(2), and so forth. The environment 100 also includes a registration server 130. Head nodes 116(1)-116(n) communicate with the registration server 130 over the network 120 to obtain LAN numbers. The registration server 130 may dispense LAN numbers as consecutive integers, for example, with each of the head nodes 116(1)-116(n) receiving a different LAN number.

The network 120 can be any type of network, including a wide area network (WAN), the Internet, a cell phone network, a data network, a satellite network, or any combination of these, for example. The computing nodes 112 may be provided in any suitable form, such as servers, laptop computers, desktop computers, tablets, smart phones, PDA's, or any combination of these, for example. Different computing nodes 112 may be provided in different forms. For example, some computing nodes 112 may include video cameras 114 but little data storage, whereas other computing nodes 112 may be provided without video cameras but include large storage arrays. Still others may include high performance processors. It is therefore understood that the environment 100 may include a diverse range of types of computing nodes 112.

The LANs 110 and nodes 112 on the network 120 of the environment 100 can be arranged to form multiple DHT rings. The nodes 112 can store the data in a distributed manner across the different nodes of the DHT rings.

Figure 2:
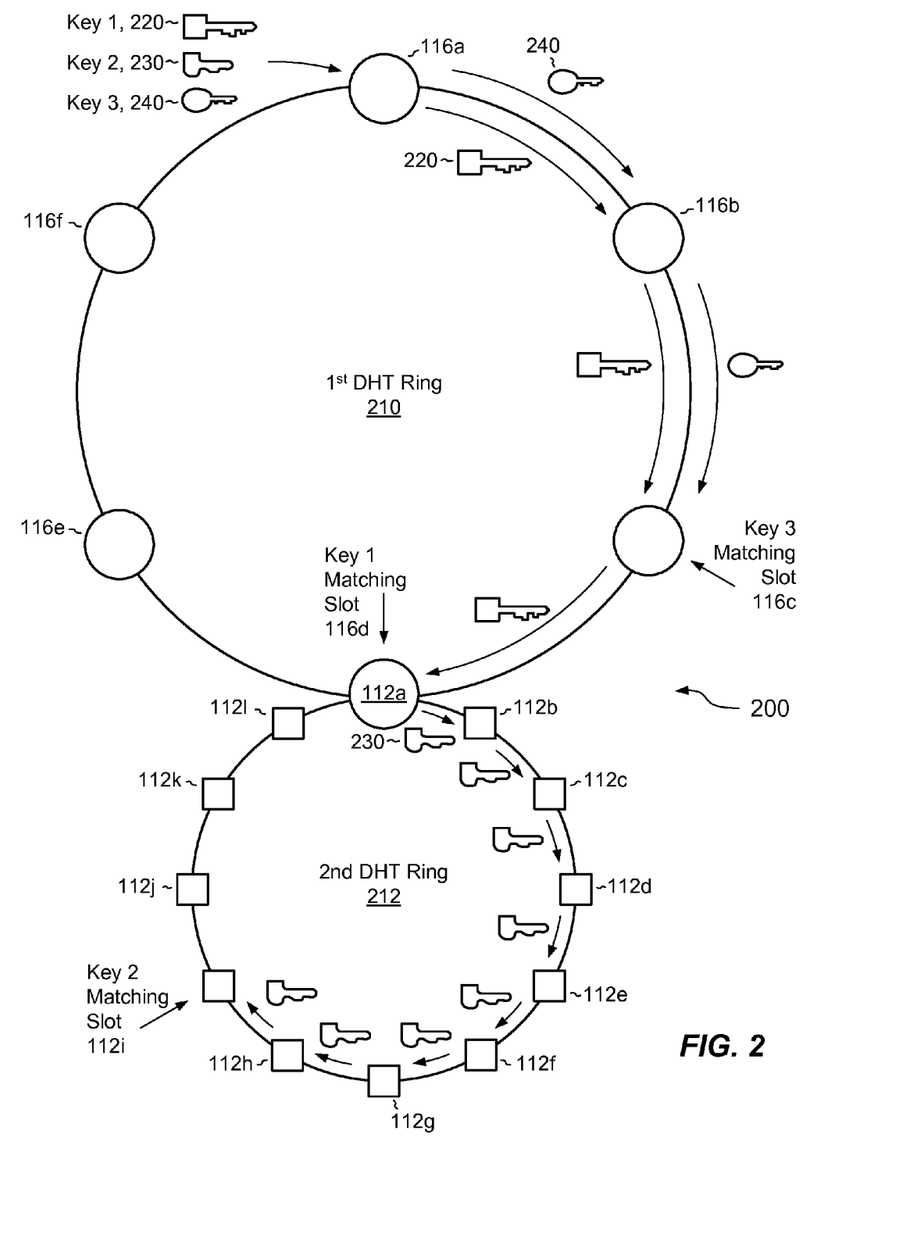
FIG. 2 is a simplified schematic of two example DHT rings formed from different LANs of FIG. 1 and different nodes within a LAN.

FIG. 2 shows an example of multiple DHT rings in the form of a 2-level DHT 200 including a first DHT ring 210 and a second DHT ring 212. The first DHT ring 210 is composed of head nodes 116a-f (i.e., some or all of the head nodes 116(1)-116(n) of FIG. 1), and the second DHT ring 212 is composed of computing nodes 112a-l. Since head nodes 116a-f represent LANs 110, the first DHT ring 210 can be regarded as a ring of LANs, and the second DHT ring 212 can be regarded as a ring of computing nodes belonging to a particular LAN. It is understood that each of the head nodes 116a-f is associated with a different second ring of nodes 212; however, only one such second ring 212 is shown for simplicity.

The arrangement of head nodes 116a-f around the first DHT ring 210 can be established in any suitable way. In one example, the LAN number of each of the head nodes 116a-f is hashed to generate a LAN ID. For instance, each of the head nodes 116a-f can be configured with the same hash function and can independently apply the hash function to compute the LAN ID from its respective LAN number. The head nodes 116a-f are then ordered according to LAN ID, e.g., with head node 116a having the lowest LAN ID and head node 116f having the highest. Since LAN IDs are hash codes of LAN numbers, there is no necessary physical or temporal pattern to the ordering of head nodes 116a-f, i.e., the ordering tends to be random. Each of the head nodes 116a-f includes routing information pointing to the next node in the first DHT ring 210. For example, head node 116a has a pointer to head node 116b, head node 116b has a pointer to head node 116c, and so on. The last head node 116f has a pointer to the first head node 116a. Head nodes 116a-f may also have pointers to preceding nodes. In some examples, each head node 116a-f, or a designated one of the head nodes 116a-f, has complete routing information for the entire first DHT ring 210, although this is not required. Routing information may be obtained, for example, from the registration server 130, from one or more nodes 112 on the network 120 designated for that purpose, or from some other source.

The arrangement of computing nodes of each of the second DHT rings 212 can also be established in any suitable way. In one example, each node 112a-l has a node ID, which is computed as a hash code of the node's MAC (media access controller) address. As is known, MAC addresses are unique to respective nodes and stable over the lifetime of the nodes. For instance, each of the nodes 112a-l can be configured with the same hash function and can independently apply the hash function to compute the node ID from its respective MAC address. Nodes 112a-l are ordered around the second DHT ring 212 based on node ID, with the node 112a having the lowest node ID and node 112l having the highest. Since node IDs are based on hash codes, there is no necessary physical or temporal pattern to the ordering of nodes 112a-l around the second DHT ring 212. Rather, as with LANs, the ordering of nodes tends to be random. Each node 112a-l stores routing information pointing to the next node of the second DHT ring 212. For example, node 112a has a pointer to node 112b, node 112b has a pointer to node 112c, and so forth. Node 112l has a pointer to node 112a. Nodes 112a-l of the second ring of nodes 212 may store additional routing information, such as pointers to preceding nodes or routing information for the entire second DHT ring 212. Routing information in each node 112a-l may be obtained by each node directly contacting other nodes in the respective LAN 110, or may be obtained from the head node 230 or from some other node designated for that purpose.

Hash keys are computed to identify a node 112 for data storage. A first hash key 220 is generated for the first DHT ring 210, and a second hash key 230 is generated for the second DHT ring 212. Generally, the first hash key 220 is computed using the same hash function used to compute the LAN ID. Similarly, the second hash key 230 is computed using the same hash function used to compute the node ID. A third hash key 240 may also be computed, not for storage of data themselves but rather for storing metadata. The metadata indicates the locations of nodes 112 where particular data are stored. The third hash key 240 is generally computed using the same hash function used to compute LAN IDs.

During operation, a computing node 112, or some other computing device on the network 120 collects data, such as video data, and directs distributed storage of the data on the network 112. Such node 112 may compute the first key 220, the second key 230, and the third key 240. The hash keys are computed in connection with the data to be stored, i.e., from the data themselves, from one or more portions of the data, or from some unique identifier associated with the data. The first key 220 is then applied to the first DHT ring 210. In one example, the first key 220 may be applied to the head node 116a, which determines whether the head node 116a satisfies one or more criteria associated with the first key 220. The criteria may include a test to determine whether the value of the first key 220 falls within the keyspace of the head node 116a. Typically, testing involves a simple conditional statement, such as determining whether the first key 220 is greater than or equal to the LAN ID for the head node 116a. If the conditional statement evaluates to false, the first key 220 is passed to the next head node 116b, which performs the same test. The first key 220 continues to be passed to successive head nodes until the conditional statement by the respective head node evaluates to true. The head node for which this occurs is identified as the matching node (e.g., 116d in the example shown), which is the first node in the DHT ring 210 for which the first key 220 is greater than or equal to the node's LAN ID. The matching node (116d) designates the LAN 110 on which the collected data, or portions thereof, may be stored.

With a LAN selected for data storage, operation proceeds by identifying a matching node within the selected LAN. In an example, to identify a matching one of the nodes 112a-l, the second key 230 is applied to the second DHT ring 212. The second key 230 is passed from node to node, with each node testing whether the node 112 satisfies one or more criteria associated with the second key 230. The criteria may include a test to determine whether the value of the second key 230 falls within the keyspace of the node 112. For example, each node may test whether the value of the key 230 is greater than or equal to its respective node ID. The matching node (here, node 112i) may then be identified as the first node in the second DHT ring 212 for which the second key 230 is greater than the node's node ID. Some or all of the collected data may then be stored on the matching node 112i.

Metadata are typically created to hold storage locations of data in the 2-level DHT 200. Once nodes are identified for data storage, routing information for those nodes (such as the nodes' IP addresses) are stored in a metadata file. The metadata file may then itself be stored in the 2-level DHT 200 using the third key 240. In some examples, the third key 240 is applied to the first DHT ring 210. The third key 240 is then passed from one head node to the next, until a matching head node is found (here, head node 116c). As with the first key 220, each head node receiving the third key 240 may test whether the third key 240 is greater than or equal to its respective LAN ID. The matching head node is identified as the first head node for which the value of the third key 240 meets this condition. Data may then be stored in the matching head node itself (e.g., 116c), in one or more of the nodes 112 of the matching head node, or in some other location designated by the matching head node.

Figure 3:
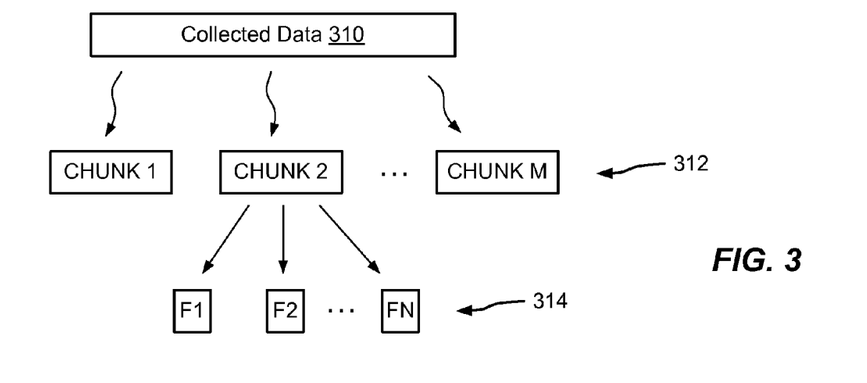
FIG. 3 is a block diagram showing an example division of data collected by a computing node into multiple chunks, which are each erasure coded to produce multiple fragments.

FIG. 3 shows an example manner in which data may be rendered for storage in the 2-level DHT 200. Here, collected data 310, such as video data obtained from a video camera 214, is divided into chunks 312. Each chunk forms a unit of data on which an erasure coding operation is performed. For example, chunk 2 may be subjected to an erasure coding operation to form multiple data fragments 314. Owing to the nature of the erasure coding operation, a total of N fragments are created, from which a minimum of any K<N fragments are needed to completely reconstruct the chunk from which the fragments 314 are created with no data loss. For example, N=20 fragments 314 may be created, of which any K=15 fragments are needed to reconstruct the chunk (here, chunk 2) without data loss, i.e., even if up to five of the fragments 314 are destroyed. The fragments 314 can then be stored in the 2-level DHT 200 in the manner described above.

In some examples, a data storage policy specifies where fragments 314 are to be stored in the 2-level DHT 200. According to one example, a first fragment F1 may be stored on the matching node 112i of the second DHT ring 212. Additional fragments may be stored on other nodes. For instance, a second fragment F2 may be stored on the next node of the second DHT ring 212 after the matching node 112i (i.e., on node 112j). A third fragment may be stored on the following node (i.e., node 112k). In cases where chunks 312 are composed of many fragments 314, one fragment may be placed on each node of the second DHT ring 212, starting at the matching node 112i and proceeding to each subsequent node, until every node 112 of the second DHT ring 212 has a fragment. Depending on storage policy, additional fragments (if there are any) may be stored elsewhere, such as on other LANs 110. For instance, additional fragments may be placed on the LAN 110 of head node 116e. If a fragment is placed on every node of the LAN 110 represented by head node 116e, and fragments still remain, additional fragments 314 may be placed on the LAN 110 associated with the next head node (e.g., 116f), and so on.

Figure 4:
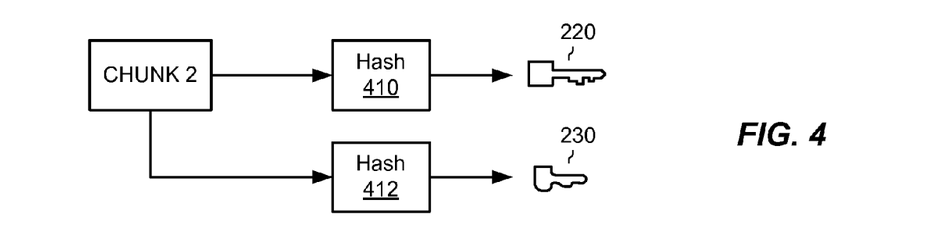
FIG. 4 is a flowchart showing a first example process for generating hash keys for the two DHT rings of FIG. 2.

FIG. 4 shows an example technique for generating the first and second hash keys 220 and 230. Hash keys 220 and 230 are generally each computed by a respective computing node 112 that collects the data to be stored, although this is not required. In this example, a chunk (e.g., Chunk 2 of FIG. 3) is subjected to two different hash functions 410 and 412. In this example, the hash function 410 is an integer hash function and the hash function 412 is a cryptographic hash function, such as the SHA-256 function designed by the National Security Agency (NSA). The two hash keys 220 and 230 are therefore distinct from each other, even though they are based on the same data source (e.g. Chunk 2).

Figure 5:
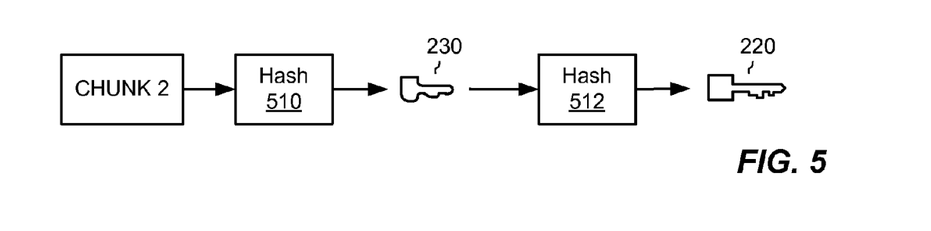
FIG. 5 is a flowchart showing a second example process for generating hash keys for the two DHT rings of FIG. 2.

FIG. 5 shows another example technique for generating the first and second hash keys 220 and 230. Here, the hash key 230 is generated from a chunk using a hash function 510, and the hash key 220 is generated from the hash key 230 using a hash function 512. In one example, the hash function 510 is a SHA-256 cryptographic hash and the hash function 512 is an integer hash function. Note that the hash keys 220 and 230 are distinct in this example, as well. Other techniques may be used to generate distinct hash keys 220 and 230. Those shown in FIGS. 4 and 5 are therefore intended merely as illustrations.

The LAN IDs and node IDs are preferably computed, respectively, using the same hash functions that are used to compute the hash keys 220 and 230. For example, if the hash keys 220 and 230 are generated as in FIG. 4, the hash function 410 is preferably applied to the LAN number of each head node to generate the respective LAN ID and the hash function 412 is preferably applied to the MAC address of each node 112 to generate the respective node ID. Similarly, if the hash keys 220 and 230 are generated as in FIG. 5, the hash function 510 is preferably applied to the LAN number of each head node to generate the respective LAN ID and the hash function 512 is preferably applied to the MAC address of each node 112 to generate the respective node ID.

Figure 6:
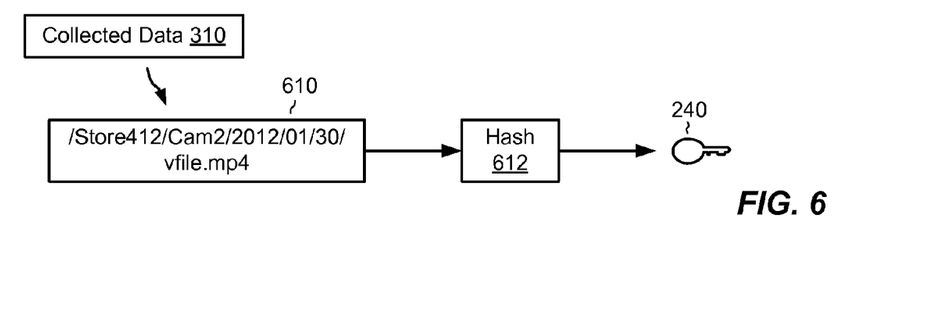
FIG. 6 is a flowchart showing an example process for generating a hash key for storing metadata that identifies at least one location of data stored in computing nodes of the environment of FIG. 1.

FIG. 6 shows an example technique for generating the third hash key 240, which is used for storing metadata. As shown, the collected data 310 collected by a node 112 may be provided in the form of a file having a path name 610. The path name 610 may include a directory prefix (e.g., "/Store412/Cam2/2012/01/30/"), which indicates information pertaining to the data stored in the file. This information may include, for example, a store number designating a location (e.g., "Store412"), a camera number indicating the location of the camera within the store (e.g., "Cam2"), and information pertaining to the date and/or time when the data was collected (e.g., "2012/01/30"). In one example, the directory prefix is hashed using hash function 612 to generate the third key 240. The hash function 612 is preferably the same as the hash function used to generate the first key 220 and the LAN ID (e.g., hash function 410 or 512).

In some examples, the directory prefix of the collected data 310 is formed according to a standard format. For instance, a standard format may be of the form STORE.CAMERA.YEAR.MONTH.DAY, as used in the path name 610. The use of a standard format allows files pertaining to particular locations and dates to be both identified and searched for based on directory prefix.

Figure 7:
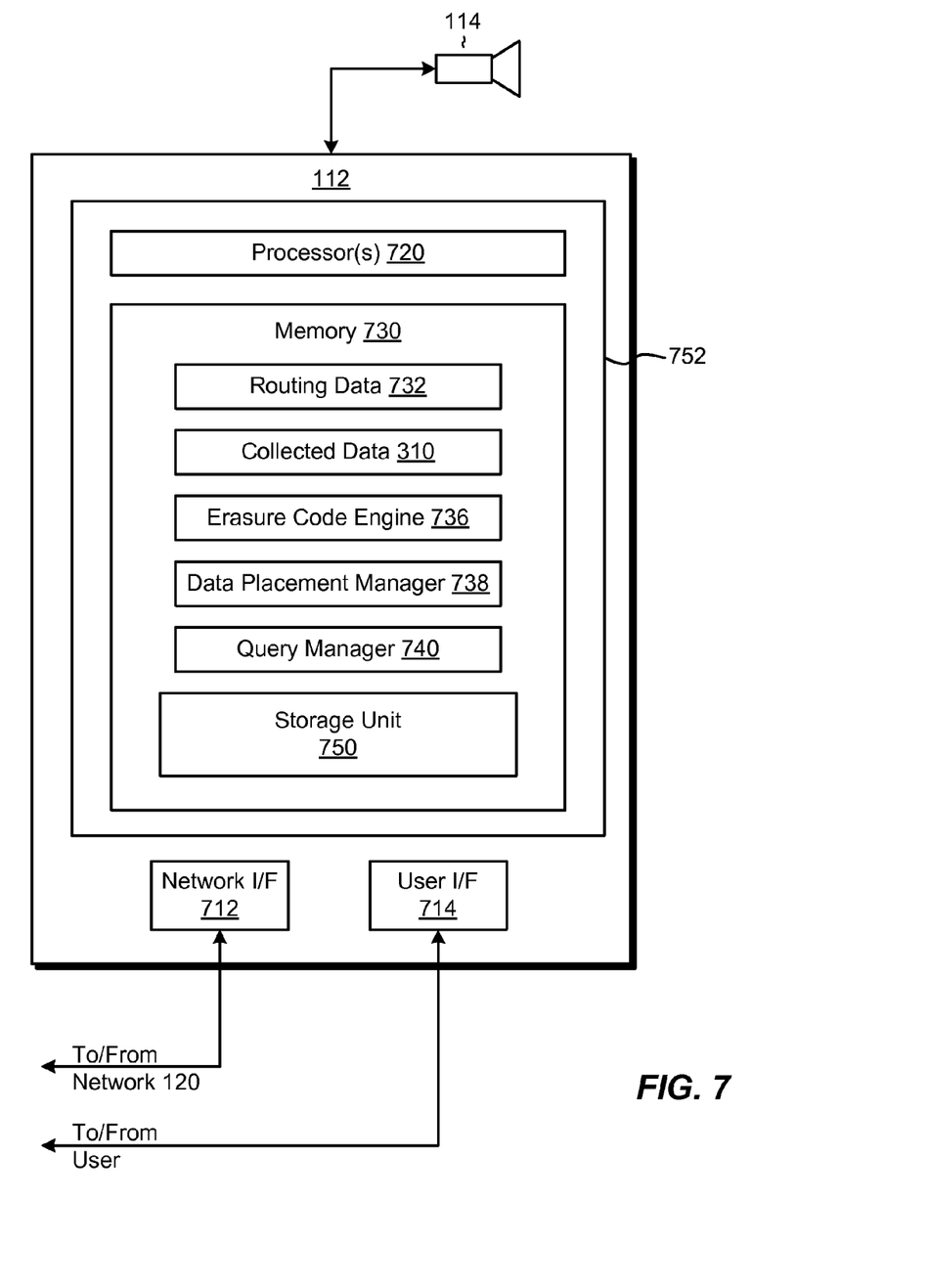
FIG. 7 is a block diagram of an example computing node of FIGS. 1 and 2.

FIG. 7 shows an example configuration of a computing node 112, which may be typical of the configurations of head nodes 116a-f of the first DHT ring 210 and computing nodes 112a-l of the second DHT ring 212, although it is expected that details of different computing nodes may vary. As shown, the computing node 112 is a computerized apparatus that includes a set of processors 720 (e.g., one or more processing chips and/or assemblies), memory 730, including both volatile and non-volatile memory, a network interface 712 for connecting the computing node 112 to the network 120, and a user interface 714 for interacting with a user. The set of processors 720 and the memory 730 together form a specialized circuit 752, which is constructed and arranged to perform functions and methods as described herein.

The memory 730 includes an operating system, programs, and other software constructs and data. Of particular relevance, the memory 730 includes routing data 732, the collected data 310 (e.g., data acquired from a video camera 114), an erasure code engine 736, a data placement manager 738, a query manager 740, and a storage unit 750, such as a disk drive or other non-volatile storage device or set of devices.

The routing data 732 stores a pointer, such as an IP address or MAC address, to a successor node in the second DHT ring 212 to which the computing node 112 belongs. The routing data 732 may also store a pointer to a preceding node in the second DHT ring 212 or to additional nodes. If the node 112 is a head node, the routing data 732 also includes a pointer to the next head node in the first DHT ring 210, and optionally to the preceding head node or to all head nodes 116a-f in the first DHT ring 210.

The erasure code engine 736 is arranged to perform erasure coding, such as by dividing collected data 310 into chunks 312 and producing N erasure coded fragments 314 of each chunk, of which a minimum of any K fragments are required to completely recover the chunk.

The data placement manager 738 is arranged to store fragments 314 derived from the chunks 312 of the collected data 310 in the 2-level DHT 200, as described above in connection with FIG. 2. The data placement manager 738 is further arranged to create and store metadata for identifying locations of the stored fragments in the 2-level DHT 200.

The query manager 740 is arranged for retrieving metadata from the 2-level DHT 200. The metadata may be used for retrieving fragments 314 placed in the 2-level DHT 200, whose locations are stored in the metadata.

The storage unit 750 may be used for local storage of data. As the computing node 112 is generally a participant in the 2-level DHT 200, the storage unit 750 may store fragments of collected data acquired by other computing nodes 112 of the 2-level DHT 200.

It is evident, therefore, that the computing node 112 of FIG. 7 may act in various capacities. For example, the node 112 may act as one of the nodes 112a-l of a LAN 110, as one of the head nodes 116a-f representing a LAN 110, as a source of collected data 130 to be stored in nodes 112 of the 2-level DHT 200, and/or as a target for storing collected data 310 acquired from other nodes 112 of the 2-level DHT 200.

Figure 8:
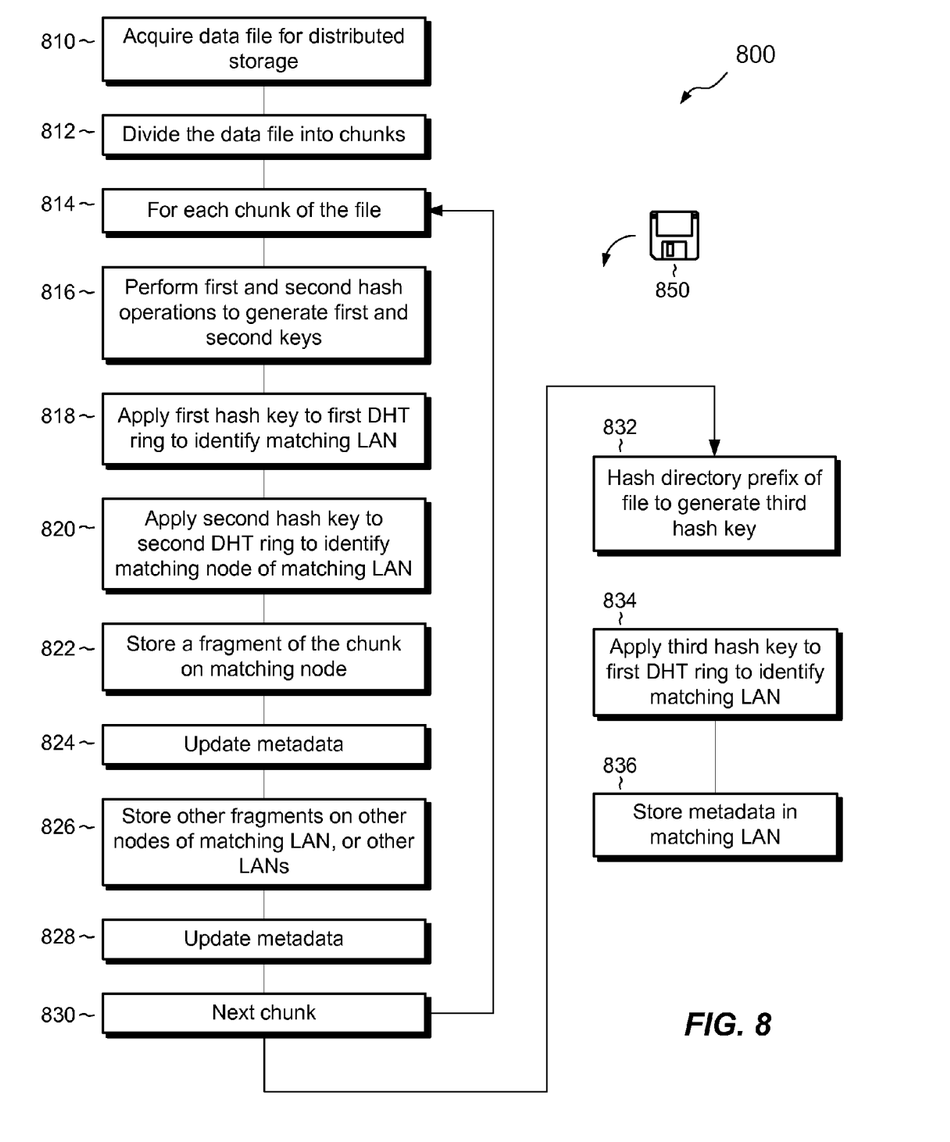
FIG. 8 is a flowchart showing an example process for storing data using the two DHT rings of FIG. 2.

FIG. 8 shows an example process 800 for placing data in the 2-level DHT 200. The process 800 may be initiated by a node 112 that collects data to be placed, and may be further conducted in a distributed manner by other nodes 112 of the 2-level DHT 200.

At step 810, data is acquired by a node 112 for distributed storage in the 2-level DHT 200. The data may be video data obtained from a video camera 114 attached to the node 112 or any other type of data.

At step 812, the data, which may be in the form of a file, is divided into chunks 312. Chunk size may be based on processing power and memory of the node 112. Larger chunks require more processing power and memory but tend to generate erasure coded fragments more efficiently than smaller chunks.

For each chunk of the file (step 814), a number of actions are performed. At step 816, first and second hashing operations are performed to generate the first and second hash keys 220 and 230, for example as described in connection with FIG. 4 or 5 above. At step 818, the first hash key 220 is applied to the first DHT ring 210 to identify a matching LAN 110, as represented by a head node (e.g., 116d). At step 820, the second hash key 230 is applied to the second DHT ring 212 to identify a matching node (e.g., 112i) of the matching LAN 110. At step 822, a fragment of the respective chunk is stored on the matching node (e.g., 112i), and, at step 824, metadata are updated to indicate the location of the newly stored fragment. In accordance with a data placement policy, other fragments 314 may be stored on other nodes 112 of the matching LAN, or on nodes of other LANs (step 826). Metadata may again be updated (step 828) to identify the location of each fragment of the respective chunk in the 2-level DHT 200. At step 830, a next chunk of the file is obtained, and steps 816, 818, 820, 822, 824, 826, and 828 are repeated for each additional chunk, until all chunks 314 of the file have been processed.

Metadata storing locations of fragments 314 for each chunk of the file are then themselves stored in the 2-level DHT 200. At step 832, the directory prefix, which has been constructed in accordance with the standard form, is hashed using the hash function 612 (e.g., an integer hash function), to produce the third hash key 240. The third hash key 240 is then applied to the first DHT ring 210 to identify a matching LAN 110 for storing the metadata. At step 836, the metadata are stored in the matching LAN 110. The metadata may be stored in the head node for that LAN 110 or in other nodes of the LAN 110. In some examples, multiple copies of the metadata may be stored in different nodes 112 of the matching LAN 110, and/or in additional locations of the 2-level DHT 200, as a safeguard against loss of the metadata in the event of a node failure.

Figure 9:
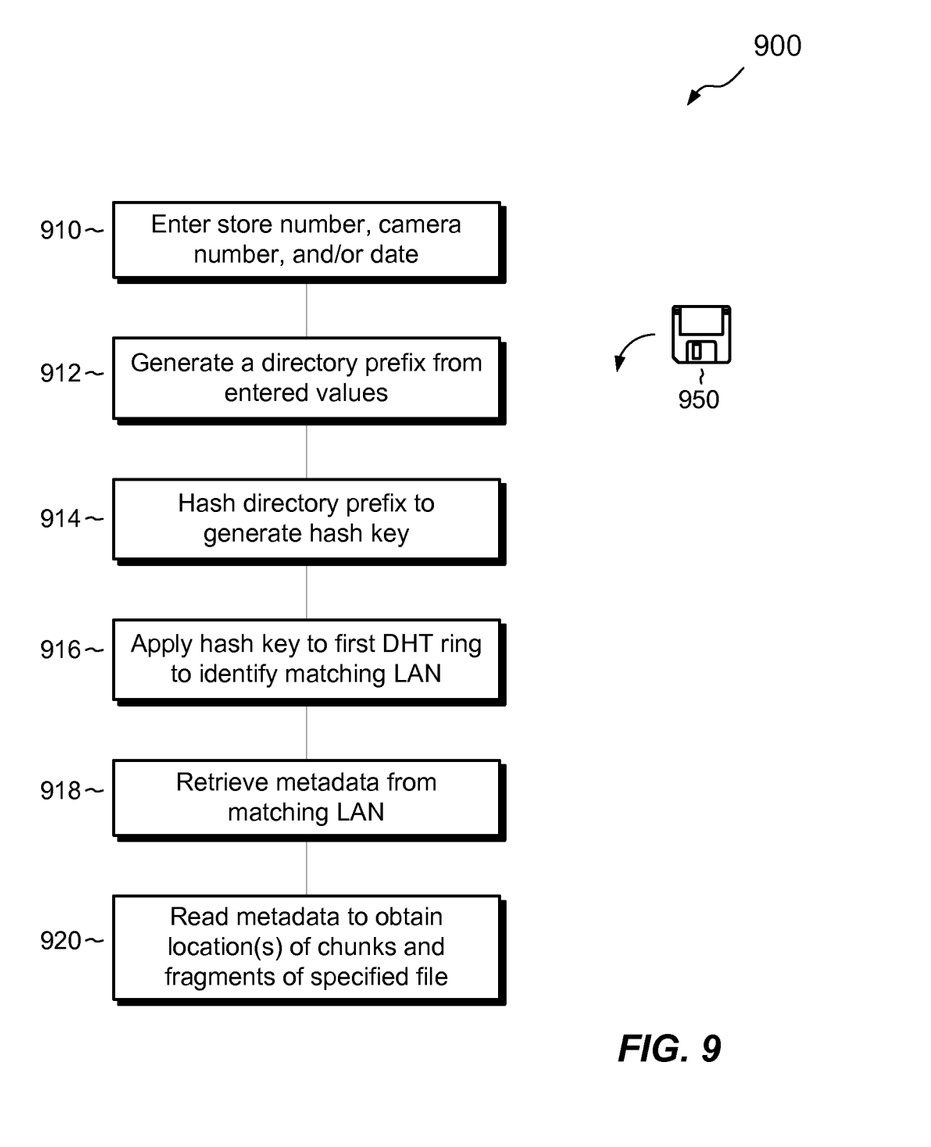
FIG. 9 is a flowchart showing an example process for retrieving data stored using the process of FIG. 8.

FIG. 9 shows an example process 900 for retrieving data from the 2-level DHT. The process 900 may be conducted by any node 112 of the 2-level DHT, or by nodes on the network 120, which are outside of the 2-level DHT 200, if any such nodes are present.

At step 910, information is specified, such as by a user or software construct, to indicate a location and/or date for which data is sought to be retrieved. At step 912, a directory prefix is generated from the entered values in accordance with the standard format. It is expected that the generated directory prefix will match the directory prefix of the original data file that has been placed in the 2-level DHT 200. At step 914, the directory prefix is hashed, using the same hash function 612 used to generate the third key 240, to generate a hash key. Since the same hash function 612 is applied to the same data, the hash key generated at step 914 matches the third hash key 240. At step 916, the hash key is applied to the first DHT ring 210 to identify a matching head node (e.g., 116c). Metadata can then be retrieved from the matching head node (step 918), or from another node 112 on the same LAN 110 as the matching head node. At step 920, the obtained metadata are read to identify locations of fragments that make up chunks of the specified file. By accessing these locations, the node 112 can reassemble the original file, thereby retrieving the file from the 2-level DHT 200.

It is understood that the various acts of the processes 800 and 900 may be ordered in any suitable way. Accordingly, embodiments may be constructed in which acts are performed in orders different from those illustrated, which may include performing some acts simultaneously, even though the acts are shown as sequential in the illustrated embodiments.

Figure 10:
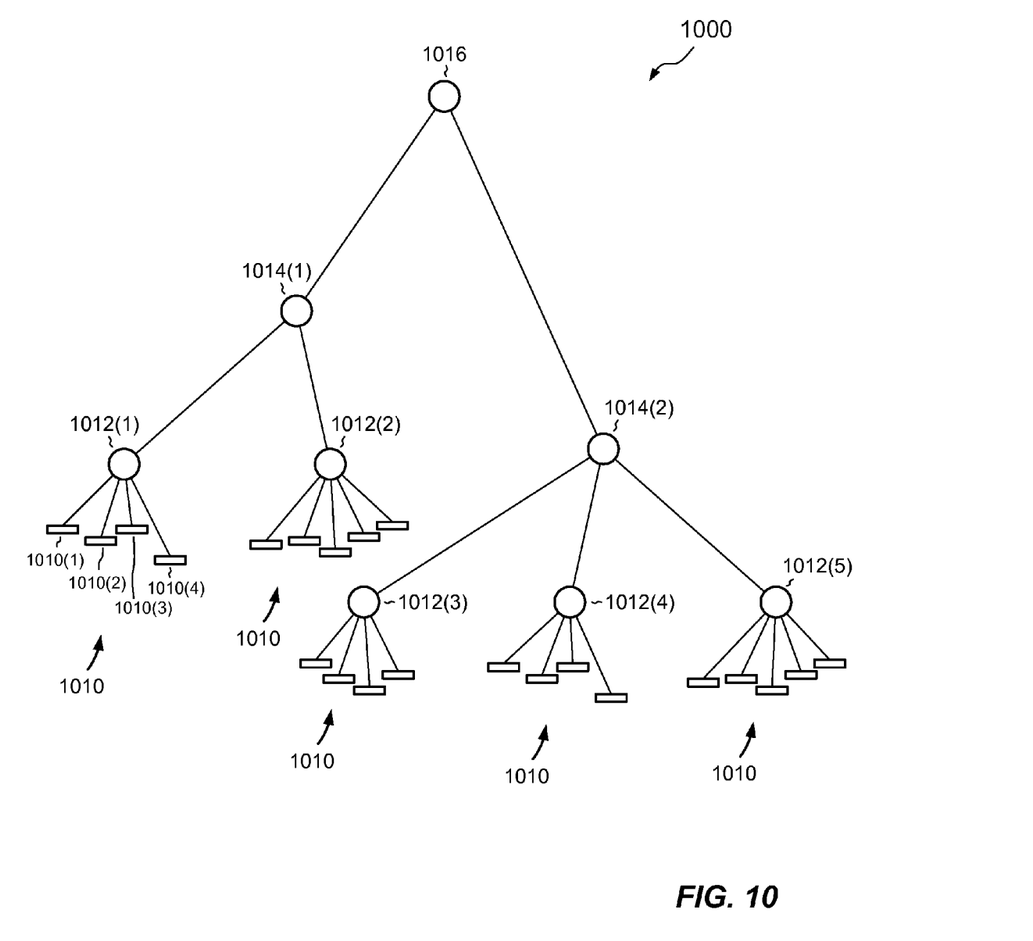
FIG. 10 is a flowchart showing an example arrangement of LANs in an overlay network that allows for data storage based on the physical locations of different LANs.

FIG. 10 shows an example arrangement of LANs 1010 in a hierarchical cluster tree 1000. The hierarchical cluster tree 1000 may be provided with one or more 2-level DHTs 200. Each LAN 1010 may be part of a first DHT ring 210 and may include nodes 112 that form a second DHT ring 212. The hierarchical cluster tree 1000 forms an overlay network to which all participating LANs 1010 and nodes 112 belong. Clusters are formed in the hierarchical cluster tree 1000 based on physical distances measured between different LANs 1010. Distances may be measured, for example using a traceroute or similar tool for measuring numbers of network hops between different LANs. First level clusters 1012(1)-1012(5) are formed based on a first distance criterion, which may be defined based on a maximum number of hops (e.g., 3 hops) between member LANs. Thus, only LANs separated by 3 hops or fewer can be part of the same first level cluster. Second level clusters 1014(1) and 1014(2) have larger distance criteria, such as 5 hops. Thus, any second level cluster includes only first level clusters whose LANs are separated by 5 hops or fewer. A single third level cluster 1016 is shown, which has yet a larger distance criterion, such as 7 hops. Thus, all LANs 1010 shown in FIG. 10 are separated by no more than 7 hops. Additional levels of clusters can be constructed, to represent more physically distant LANs 1010.

A 2-level DHT 200 may be constructed from LANs 1010 and nodes 112 of the hierarchical cluster tree 1000. The 2-level DHT may include all LANs 1010 and nodes 112 of the hierarchical cluster tree 1000, or may include a selected subset of LANs and nodes. Data may then be placed in the 2-level DHT 200 based on physical proximity requirements. In one example, a 2-level DHT 200 may be restricted only to the LANs within the single first level cluster (e.g., only to LANs 1010(1)-1010(5) of cluster 1012(1)). Imposing this restriction ensures that all LANs included in the 2-level DHT 200 are within 3 hops, for example, thereby reducing network traffic over longer distances.

Data may also be placed so as to disperse fragments more widely. For example, a 2-level DHT ring 200 may be constructed from LANs belonging to more widely separated clusters, e.g., one LAN from each of clusters 1012(1)-1012(5). Placing data in this manner may promote reliability, because, for example, a power failure in the location where one fragment is stored will typically not interfere with retrieval of other fragments, which one may still be able to combine via erasure coding to recover the complete data file.

Location-based policies can be put into effect even when all LANs 1010 of the hierarchical cluster tree 1000 are included in the same 2-level DHT 200. For example, although a first fragment is typically stored based on the first and second hash keys 220 and 230, placement of other fragments 314 are based on policy. The policy may place additional fragments 314 on physically close LANs 1010, or may disperse them more widely so as to promote reliability.

The hierarchical cluster tree 1000 thus affords a wide range of opportunities to include distance or locality constraints in policies for placing data in the 2-level DHT 200. These constraints can operate to reduce network traffic and/or improve the reliability of stored data.

The multi-level DHT disclosed herein provides numerous advantages over prior, single-level designs. For example, providing different DHT rings at different levels of a network hierarchy promotes efficient data storage. Rather than applying a single hash key to a large number of nodes spanning across a computer network, multiple hash keys are instead applied to much smaller numbers of nodes. Since the selection of one node at any level of the hierarchy greatly narrows the number of candidates at each successive level, the total number of nodes traversed in a hierarchical DHT arrangement is much smaller that the number of nodes that would have to be traversed in a flat structure. Efficiency is correspondingly improved.

Also, the use of different hashing operations at different DHT levels helps to promote load balancing. In the 2-level DHT 200 disclosed, the hash functions used to generate the first and second hash keys 220 and 230 typically produce evenly distributed hash codes, even when they are applied to similar input data. The resulting quasi-randomness of hash codes helps to ensure, on the average, that data are evenly distributed, both among different LANs of the first DHT ring 210 and among different computing nodes 112 of the second DHT ring 212. Hot spots, i.e., nodes where data storage tends to concentrate, are therefore generally avoided.

Providing LANs 110 as elements of the first DHT ring 210 promotes stability in the 2-level DHT 200. LANs tend to be much more enduring than individual computing nodes 112. Even if the head node for a LAN were to fail, the head node could promptly be replaced by another node of the same LAN, keeping the LAN intact as a stable construct. Nodes 112 within the second DHT ring 212 generally occupy the same routing domain, such that failures of nodes 112, as well as additions of new nodes and removals of old nodes, can be managed within the respective LAN 110, without requiring substantial communication (and consequent network traffic) outside the respective LAN 110.

An improved technique has been described for distributed data storage that employs multiple DHT rings provided at different levels of a network hierarchy. Arranging nodes in multiple DHT rings according to the network hierarchy greatly improves the efficiency of data storage and provides other advantages, such as load balancing, reliability, and fault tolerance.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, although the collected data 310 has been identified by example as video data, the data can be any form of data collected for any purpose.

Also, as shown and described, nodes 112 may act as both sources of data to be stored in the 2-level DHT 200 and as targets for storage of data from other nodes 112. Data to be stored, however, can originate from other sources besides the nodes 112 themselves, such as from computing devices outside the 2-level DHT 200.

Also, although identifying a matching node in the first and/or second DHT rings 210/212 is described as a sequential process, where each node around a respective DHT ring receives a key in turn and compares the key with its keyspace, this is merely an example. Alternatively, each DHT ring 210/212 can include a table associating some nodes of the respective ring with keyspaces (e.g., a finger table). Such as table would allow the DHT rings 210/212 to be traversed with substantially fewer hops. In other examples, a particular node may be designated for holding a complete table of all nodes in a DHT ring, which may allow direct matching of keys to keyspaces, e.g., without any hops around the ring. It is understood, therefore, that the DHT rings 210/212 can be traversed according to a variety of techniques. The techniques disclosed should therefore be viewed merely as examples.

As shown and described, the first hash key 220 and the third hash key 240 are generated using an integer hash function and the second key 230 is generated using a cryptographic (SHA-256) hash function. It is understood that these are merely examples, however. Other hash functions may be used, including hash functions yet to be developed.

Also, it has been described that data are stored in a LAN 110 represented by a matching head node (e.g., 116d) of the first DHT ring 210, which is the head node whose keyspace includes the first hash key 220. Alternatively, an initial head node resolved by keyspace mapping can include a pointer to another head node in the first DHT ring 210. Any DHT operation initially resolving to a head node can thus be forwarded to another head node, which becomes the matching head node. Thus, the criteria associated with the first key 220 may include not only a test for whether the first key 220 is within a head node's keyspace, but also any forwarding information provided by the respective head node. Nodes 112 of the second DHT ring 212 can also include forwarding information. The criteria associated with the second key 230 may thus include not only a test for whether the second key 230 is within a node's keyspace, but also any forwarding information provided by an initially resolved node 112.

Also, although a 2-level DHT 200 is specifically shown and described, it is understood that other multi-level DHTs can be formed, including those with greater than two levels. For example, referring to FIG. 10, one can devise a multi-level DHT including a ring of second level clusters (e.g., 1014(1) and 1014(2)), a ring of first level clusters within each second level cluster, a ring of LANs 1010 within each first level cluster, and a ring of nodes 112 within each LAN. Different hash keys may be provided at different levels. A multi-level DHT can thus be applied to any number of levels of a network hierarchy.

Similarly multi-level DHTs can be formed from constructs other than LANs and/or nodes within LANs. For instance, a 2-level DHT can be formed from level 2 clusters and level 1 clusters of the hierarchical cluster tree 1000. Selections of LANs, or nodes within LANs, can be made using other techniques.

Also, in some examples, a DHT ring 210 is formed to define a ring of LANs, but no separate DHT ring is defined for a ring of nodes within each LAN. Instead, another technique is used to select nodes within LANs.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 850 and 950 in FIGS. 8 and 9). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:
1. A method of storing data in a computing network, comprising:
acquiring live video data by a camera coupled to a computing node of the computing network;
dividing, by the computing node, the acquired live video data into multiple chunks, each chunk including a portion of the acquired live video data; and
for each chunk:
erasure coding the chunk to create erasure coded fragments;
performing a first hashing operation to generate a first key;
performing a second hashing operation to generate a second key;
applying the first key to a first logical ring of computing nodes of the computing network to identify a matching node that satisfies at least one criterion associated with the first key, the first logical ring of computing nodes organized according to a first level of a multi-level DHT (distributed hash table), such that each computing node in the first logical ring of computing nodes forms a respective node in the first level of the multi-level DHT;
applying the second key to a second logical ring of computing nodes of the computing network to identify a matching node of the second logical ring of computing nodes that satisfies at least one criterion associated with the second key, the second logical ring of computing nodes organized according to a second level of the multi-level DHT, such that each computing node in the second logical ring of computing nodes forms a respective node in the second level of the multi-level DHT, wherein the second logical ring of computing nodes includes the matching node of the first logical ring of computing nodes and a set of nodes that are distinct from the first logical ring of computing nodes; and
directing at least one of the erasure coded fragments to be stored on the matching node of the second logical ring of computing nodes, wherein the computing node that is coupled to the camera is a computing node of the multi-level DHT, and wherein the method further comprises directing metadata describing one or more storage locations of the erasure coded fragments to be stored in one more computing nodes of the second logical ring of computing nodes.

2. The method as recited in claim 1, wherein the computing network is arranged hierarchically with the first logical ring of computing nodes operating at a first network level of the computing network and the second logical ring of computing nodes operating at a second network level of the computing network that is lower than the first network level, and wherein the first logical ring of computing nodes includes multiple head nodes, each representing a different Local Area Network (LAN) of the computing network.

3. The method as recited in claim 2, wherein each head node in the first logical ring of computing nodes includes routing information pertaining to at least one other head node in the first logical ring of computing nodes.

4. The method as recited in claim 3, wherein each computing node in the second logical ring of computing nodes includes routing information pertaining to at least one other computing node in the second logical ring of computing nodes.

5. The method as recited in claim 2, wherein, when directing at least one of the erasure coded fragments to be stored on the matching node, the method further includes directing at least some of the erasure coded fragments to be stored on different computing nodes of the second logical ring of computing nodes.

6. The method as recited in claim 5, wherein the method further includes identifying a head node in the first logical ring of nodes other than the matching node and storing additional erasure coded fragments of the chunk in the LAN represented by the identified head node.

7. The method of claim 2, wherein each of the first ring of computing nodes represents a respective LAN and is also a member of a respective second ring of computing nodes within the respective LAN.

8. The method of claim 2, further comprising:
acquiring live video data by each of multiple cameras coupled to respective computing nodes of the multi-level DHT; and
storing, by each of the multiple computing nodes of the computing network, fragments of the respective live video data collected on multiple other computing nodes of the multi-level DHT.

9. The method of claim 8, wherein the multiple computing nodes of the computing network that collect video data include the computing node as recited in claim 1, wherein the method further comprises the first computing node:
performing a third hashing operation to generate a third key, wherein the third key is different from the first key and the second key and identifies a head node in the first ring of computing nodes,
wherein directing metadata includes directing the metadata to be stored on the LAN represented by the identified head node, the metadata indicating locations where fragments of video data acquired from the camera of the first computing node are stored.

10. The method of claim 9,
wherein, prior to performing the hashing operation to generate the third key, the method further comprises the first computing node generating a text value in a uniform naming format, the text value including a camera identifier of the camera of the first computing node and a date, wherein performing the hashing operation to generate the third key is performed by applying the text value to a third hash function, and wherein the method further comprises, after storing the metadata and by a computing node of the computing network other than the first computing node:
receiving entered values specifying (i) a camera identifier, identifying a camera from which video data is sought, and (ii) a date on which desired video data was acquired;
generating a text value in the uniform naming format based on the entered values;
performing the hashing operation on the generated text value using the third hash function to generate the third key;
identifying a head node in the first ring of computing nodes using the third key;
retrieving metadata from the LAN represented by the identified head node, the metadata indicating locations where fragments of video data acquired from the camera of the first node are stored; and
retrieving the fragments of video data acquired from the camera of the first node from the indicated locations.

11. The method of claim 2, further comprising each computing node of the first ring of computing nodes obtaining a LAN number from a registration server and hashing the LAN number to generate a LAN ID, wherein applying the first key to the first logical ring of computing nodes of the computing network includes comparing the first key with the LAN ID of at least one computing node of the first ring of computing nodes.

12. The method of claim 11, further comprising each computing node of the second ring of computing nodes hashing a MAC (Media Access Controller) address of the respective computing node to generate a node ID, wherein applying the second key to the second logical ring of computing nodes of the computing network includes comparing the second key with the node ID of at least one computing node of the second ring of computing nodes.

13. The method as recited in claim 2, further comprising selecting the first logical ring of computing nodes from a larger set of computing nodes on the computing network, wherein the computing nodes included in the first logical ring of computing nodes are selected based at least in part on physical proximity to one another.

14. The method as recited in claim 2, wherein the acquired live video data is associated with an identifier, and wherein the method further comprises:
performing a third hashing operation on the identifier to generate a third key; and
applying the third key to the first logical ring of computing nodes to identify a head node that satisfies at least one criterion associated with the third key,
wherein the act of directing the metadata includes directing metadata pertaining to a storage location of at least one of the erasure coded fragments to be stored in the LAN represented by the identified head node.

15. The method as recited in claim 1, wherein the first hashing operation and the second hashing operation are computed based on the same data source.

16. The method as recited in claim 15, wherein the first hashing operation generates the first key by applying a first hashing function to the data source, and the second hashing operation generates the second key by applying a second hashing function to the data source, the second hashing function being different from the first hashing function.

17. The method as recited in claim 15, wherein the second hashing operation is performed on the source data to generate the second key and the first hashing operation is performed on the second key to generate the first key.

18. The method as recited in claim 14, wherein the computing node that is coupled to the camera stores the acquired live video data in a file, and wherein the identifier includes at least a portion of a path name of the file.

19. The method as recited in claim 14, wherein the multiple chunks are obtained by dividing the file into the multiple chunks.

20. The method as recited in claim 19, wherein the path name of the file has a uniform naming format that includes at least one of location information and date information, and wherein the method further comprises:
creating a text value in the form of a path name according to the uniform naming format to specify a file based on at least one of location information and date information;
hashing the text value, when performing the hashing operation on the identifier, to generate the third key;
identifying the LAN on which metadata pertaining to the specified file is stored;
reading the metadata; and
obtaining a location from the metadata of at least one fragment of the file.

21. A computerized apparatus, comprising:
a set of processors; and
memory, coupled to the set of processors, the memory arranged to store instructions executable by the set of processors,
wherein the set of processors executing instructions from the memory forms a specialized circuit arranged to:
acquire live video by a camera coupled to a computing node of the computing network;
divide, by the computing node, the acquired live video into multiple chunks, each chunk including a portion of the acquired live video; and
for each chunk:
erasure code the chunk to create erasure coded fragments;
perform a first hashing operation to generate a first key;
perform a second hashing operation to generate a second key;
apply the first key to a first logical ring of computing nodes of a computing network to identify a matching node that satisfies at least one criterion associated with the first key, the first logical ring of computing nodes organized according to a first level of a multi-level DHT (distributed hash table), such that each computing node in the first logical ring of computing nodes forms a respective node in the first level of the multi-level DHT;
apply the second key to a second logical ring of computing nodes of the computing network to identify a matching node of the second logical ring of computing nodes that satisfies at least one criterion associated with the second key, the second logical ring of computing nodes organized according to a second level of the multi-level DHT, such that each computing node in the second logical ring of computing nodes forms a respective node in the second level of the multi-level DHT, wherein the second logical ring of computing nodes includes the matching node of the first logical ring of computing nodes and a set of nodes that are distinct from the first logical ring of computing nodes; and
direct a storing operation of at least one of the erasure coded fragments on the matching node of the second logical ring of computing nodes,
wherein the computing node that is coupled to the camera is a computing node of the multi-level DHT, and
wherein the specialized circuit is further arranged to direct metadata describing one or more storage locations of the erasure coded fragments to be stored in one more computing nodes of the second logical ring of computing nodes.

22. The computerized apparatus as recited in claim 21, wherein the computing network is arranged hierarchically with the first logical ring of computing nodes operating at a first network level of the computing network and the second logical ring of computing nodes operating at a second network level of the computing network that is lower than the first network level, and wherein the first logical ring of computing nodes includes multiple head nodes, each representing a different Local Area Network (LAN) of the computing network.

23. The computerized apparatus as recited in claim 22, wherein the acquired live video is associated with an identifier and wherein the specialized circuit is further arranged to:
perform a third hashing operation including a hashing function on the identifier to generate a third key; and
apply the third key to the first logical ring of computing nodes to identify a head node that satisfies at least one criterion associated with the third key,
wherein, when arranged to direct metadata, the specialized circuit is further arranged to direct metadata pertaining to a storage location of at least one of the erasure coded fragments to be stored in the LAN represented by the identified head node.

24. A computer program product including non-transitory computer readable medium having instructions which, when executed by a set of processors of a computerized apparatus, cause the set of processors to perform a method of storing data in a computing network, the method comprising:
acquiring live video by a camera coupled to a computing node of the computing network;
dividing, by the computing node, the acquired live video into multiple chunks, each chunk including a portion of the acquired live video; and
for each chunk:
erasure coding the chunk to create erasure coded fragments;
performing a first hashing operation to generate a first key;
performing a second hashing operation to generate a second key;
applying the first key to a first logical ring of computing nodes of the computing network to identify a matching node that satisfies at least one criterion associated with the first key, the first logical ring of computing nodes organized according to a first level of a multi-level DHT (distributed hash table), such that each computing node in the first logical ring of computing nodes forms a respective node in the first level of the multi-level DHT;
applying the second key to a second logical ring of computing nodes of the computing network to identify a matching node of the second logical ring of computing nodes that satisfies at least one criterion associated with the second key, the second logical ring of computing nodes organized according to a second level of the multi-level DHT, such that each computing node in the second logical ring of computing nodes forms a respective node in the second level of the multi-level DHT, wherein the second logical ring of computing nodes includes the matching node of the first logical ring of computing nodes and a set of nodes that are distinct from the first logical ring of computing nodes; and directing at least one of the erasure coded fragments to be stored on the matching node of the second logical ring of computing nodes, wherein the computing node that is coupled to the camera is a computing node of the multi-level DHT, and wherein the method further comprises directing metadata describing one or more storage locations of the erasure coded fragments to be stored in one more computing nodes of the second logical ring of computing nodes.

25. The computer program product as recited in claim 24, wherein the acquired live video data is associated with an identifier, and wherein the method further comprises:

performing a third hashing operation including performing a hashing function on the identifier to generate a third key; and applying the third key to the first logical ring of computing nodes to identify a node that satisfies at least one criterion associated with the third key, wherein the act of directing metadata includes directing metadata pertaining to a storage location of at least one of the erasure coded fragments to be stored in a LAN of the identified node.

* * * * *